United States Patent
Fuhrer

[19]

[11] Patent Number: 6,105,005
[45] Date of Patent: Aug. 15, 2000

[54] SYSTEM FOR ENHANCED FINANCIAL TRADING SUPPORT

[75] Inventor: Evelyn Fuhrer, Brooklyn, N.Y.

[73] Assignee: Merrill Lynch & Co., Inc., New York, N.Y.

[21] Appl. No.: 08/993,382

[22] Filed: Dec. 18, 1997

Related U.S. Application Data

[63] Continuation of application No. 08/306,382, Sep. 15, 1997, abandoned.

[51] Int. Cl.[7] ............................. G06F 15/30; G06F 17/60
[52] U.S. Cl. ................................. 705/35; 705/37
[58] Field of Search ................. 705/35, 37; 714/13; 713/200, 201; 360/825.26, 825.27; 379/111

[56] References Cited

U.S. PATENT DOCUMENTS

| | | | |
|---|---|---|---|
| 4,403,303 | 9/1983 | Howes et al. ............................. 364/900 |
| 4,872,106 | 10/1989 | Slater ....................................... 364/200 |
| 5,297,032 | 3/1994 | Trojan et al. ............................ 364/408 |
| 5,504,861 | 4/1996 | Crockett et al. .................... 395/182.11 |
| 5,544,347 | 8/1996 | Yanai et al. .............................. 395/489 |
| 5,596,706 | 1/1997 | Shimazaki et al. ................ 395/182.04 |
| 5,627,886 | 5/1997 | Bowman ................................... 379/111 |
| 5,802,499 | 9/1998 | Sampson et al. ........................ 395/235 |
| 5,982,900 | 4/1999 | Ginter et al. ............................ 395/186 |

*Primary Examiner*—Tod R. Swann
*Assistant Examiner*—Pedro R. Kanof
*Attorney, Agent, or Firm*—Hopgood, Calimafde, Kalil & Judlowe

[57] ABSTRACT

A multi-purpose data processing system that is capable of going on-line to provide an operative link with established financial markets in support of subscriber trading. The system has two modes of operation. A first mode is directed to support for financial transactions or services that are necessary, but not critical. The second mode addresses a lost trading link from a primary trading system pursuant to a catastrophic event, and provides a remote trading platform to a plurality of pre-select traders. The second mode is accessible via disaster declaration, and the system permits custom terminal configuration in accordance with designated traders. Operation allows quick assess to markets when the primary market link outlet is down.

16 Claims, 7 Drawing Sheets

DATABASE QUERY AND MAINTENANCE USING INSIGHT

ATS VIRTUAL WINDOW MANAGER

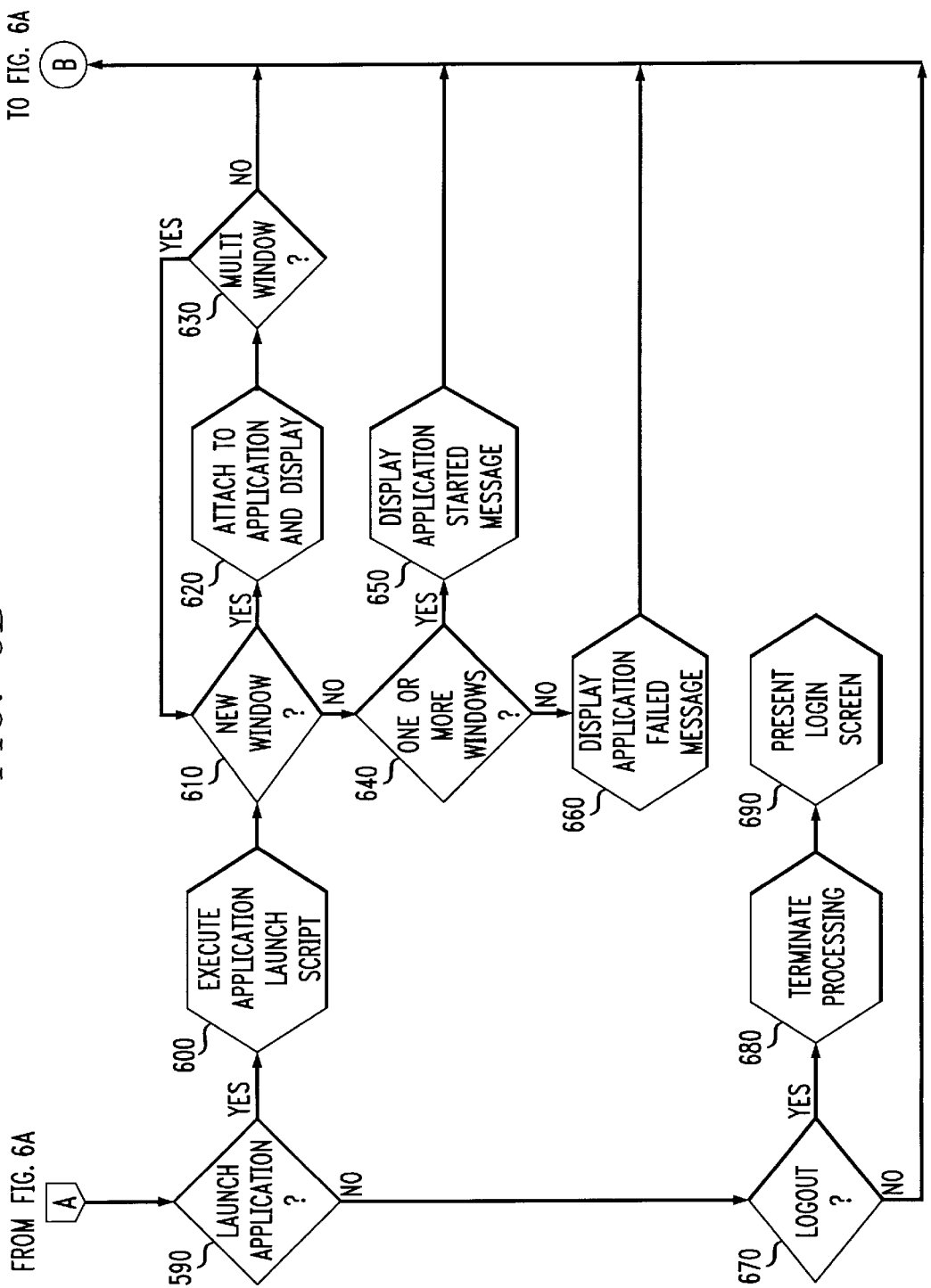

SYSTEM FOR ENHANCED FINANCIAL TRADING SUPPORT

This application is a continuation of application Ser. No. 306,382, filed Sep. 15, 1997, now abandoned.

The present invention generally relates to a system for supporting rapid and flexible trading on financial markets. In particular, the present invention relates to a data processing system for providing a seamless trading capability on-line after a catastrophic interruption of normal trading services.

BACKGROUND OF THE INVENTION

Current financial markets are characterized by enormous computer systems centrally operated in select financial centers. These elaborate data processing systems govern market transactions for the exchange of large sums of capital via interactive participation of many buyers and sellers and thus form discrete trading markets or "exchanges". Specifically, traders are in continuous communication via the computer networks with other traders, forming transactions at select price and volume for particular securities. Access to these markets are via established trading applications such as TSS, NASD, and other custom design applications. Operation of a representative trading application is described in detail in U.S. Pat. No. 4,674,044 to Kalmus, et al., the contents of which are incorporated by reference as if restated in full.

To support their efforts on behalf of their clients, the traders have access to a plethora of information services, e.g., Reuters, Telerate, Quotron and Bridge, which provide a cross section of important data to the trader (often in real time) to permit more successful and knowledgeable trading.

To participate in this activity, the traders are often equipped with powerful multipurpose work stations interconnected to that selection of information services and market participants important to that trader. For example, U.S. Pat. No. 5,297,032 to Trojan, et al. provides a specific form of work station environment for participation in a select market; the teachings of this patent are incorporated by reference as if restated in full. The traders' overall performance is significantly enhanced by their ability to keep abreast of market defining events, via on-line data acquisition.

The importance of trading in a timely manner simply cannot be overstated. The rapid movement from one security to another based on the changing financial environment is critical to the overall profitability of the transactions and the ultimate success of the trader. Interruptions to the markets of interest simply cannot be tolerated for long, and therefore, must be avoided. However, the centralized level of activity by major brokerage houses to effect the trading patterns on behalf of their clients has created a separate and only recently recognized danger of interruption.

This risk was brought into prime focus by the 1993 bombing of the World Trade Building complex in lower Manhattan—the "twin towers" located within blocks of Wall Street and the New York Stock Exchange (NYSE) trading floor. This event brought the major market traders "off-line" for a significant length of time and represented a far greater level of service interruption to market activity on the NYSE and other markets than ever previously imagined. Even so, participants recognized that it could have been far worse in extent interference with capital market activity. The repercussions of being off-line for a major brokerage house are enormous, especially if world events are fast moving and create significant swings in asset value.

Indeed, although the bombing of the World Trade Building was a high profile event, it was not unique. Such events have occurred over the course of the last few years and include the flooding of the Chicago river—shutting down the Future Exchange in Chicago for a protracted period. Other interruptions in service were precipitated by trading floor fires in New York, Hurricane Andrew, a flood in New York associated with a water main break, and certain manmade interruptions (e.g., Audits). During the course of these interruptions, persons utilizing certain brokerage services were precluded from assessing market conditions and trading in response to these conditions.

The problem and vulnerability of the current trading systems reside, to some degree, in their centralized location coupled with the inability to reroute traders from the network of dedicated computer terminals for on-line trading. A catastrophic event can therefore take capital transactions off-line in a key market, causing short term losses and long term negative perceptions of the market performance. The present invention has been developed to address this problem.

SUMMARY AND OBJECTS OF THE PRESENT INVENTION

It is an object of the present invention to provide a data processing system for managing financial trading activities in a comprehensive fashion in response to a system interruption.

It is another object of the present invention to provide an apparatus capable of going on-line to trade in financial markets in response to a interruption in current system operations, wherein said apparatus is a programmed controlled digital computer interconnected with a communication system permitting direct trading access to one or more financial markets.

It is still another object of the present invention to provide a method of data processing that enables continuous trading of securities on established markets on behalf of clients in response to a market interrupting event.

It is yet another object of the present invention to provide a data processing system capable of operating in two modes. The first mode involves a day-to-day support activity for a particular aspect of the financial services business, such as dividend maintenance, and a second mode relating to active real time trading of securities.

The above and other objects of the present invention are realized in a digital computer system networked with multiple nodes of work stations and interconnected to one or more markets for electronic trading of securities. The data processing system includes separately programmed work stations each linked to the markets and services necessary to effect trading of securities on behalf of the clients. In addition, each work station includes a second mode of operation, directed to some day-to-day activity that is relatively less critical to overall operations in comparison to security trading. These work stations are located at a remote site from the trading floor and the primary trading work stations. The remotely located work stations are fully capable of financial trading transactions, but include security buffers to preclude unauthorized access.

In accordance with the varying aspects of the present invention, the work stations and the system coordinator provide custom access codes for each work station so that a pre-selected codeword is employed to configure the work station to a particular trader. In this way, the trader logs onto the system with the access codeword and the interconnects specific to that trader are loaded into the work station to permit select access to the markets and services required by that trader.

The foregoing features of the present invention may be more fully understood by reference to the following detailed description of a specific illustrative embodiment thereof, presented hereinbelow in conjunction with the accompanying drawings, in which:

DETAILED DESCRIPTION OF THE PREFERRED EMBODIMENTS

First briefly in overview, the present invention is directed to emulating a trading floor capability at a remote location employing hardware that is overwise in use—but for a service that can be periodically interrupted. The system includes hardware configuration and tools implemented with a plurality of select stored programs controlling the computer system in accordance with system directives. In particular, the system is designed to be reconfigured from its less critical functions to operate as an array of trading work stations, each of which is configured to a particular trader and thereby connected to that trader's select information services, trading partners and exchanges. The fundamental objective is to recreate a trading floor environment that emulates actual trading performance for the administrator, so that the traders can insure liquidity and protect clients' and firm assets on the markets after conventional (primary) trading has been interrupted. Secondary objectives include the utilization of the work stations during periods of off-line operation in a productive manner thus diluting the capital commitment to the exigent circumstances. Moreover, a coordinated security system is interposed to preclude unauthorized access to the work station trading capabilities during down times, thus preventing improper or illegal trading.

Figure 1:
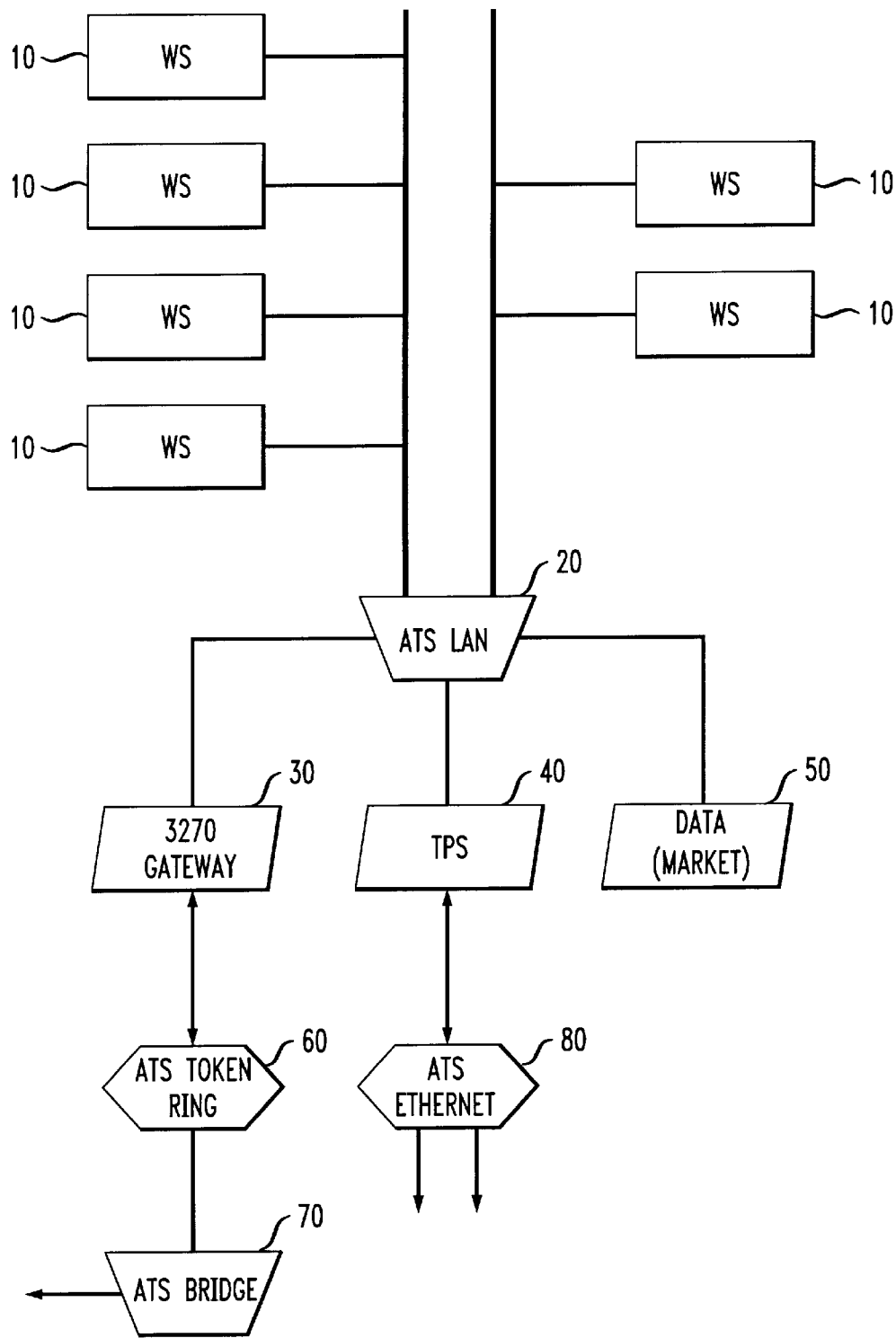
FIG. 1 is a system diagram of the data processing workstations used in permitting active on-line trading in accordance with the present invention.

With the foregoing overview in mind, attention is directed to FIG. 1 which depicts an overall system diagram in functional block form. In particular, a plurality of work stations are arranged in a location remote from the primary trading floor for the system proprietor, preferably in one or more clusters 15 with individual stations 10. These work stations are stand alone computers interconnected to a network 20 via conventional network infrastructure, but individually programmed in accordance with overall system dictates. These work stations each are equipped with monitor, advanced CPU and at least 32 Mbytes of internal memory. It has been found that SPARC Stations sold by Sun Computer are suitable for these purposes and are configured with one or more operating systems including UNIX with variations of XWINDOWS support.

The UNIX based workstation is designed to provide access to multiple applications resident on a diverse set of hardware platform as may be required by the user. This requires that the applications operate concurrently without conflict—and thus must be compatible. The plural workstations are networked via Ethernet to address three servers. Referring to FIG. 1, these servers include the Trader Profile (Sybase database) server 40, the 3270 Gateway to the mainframe 30 and the Market Data (real time) server 50. Continuing, mainframe application access is via Token Ring Backbone 60 to the Bridge 70 and various off-site mainframe networks and Sybase access is routed through a Ethernet Backbone 80 to one or more subnetworks. Access is controlled via one or more user identification numbers USERID(I), wherein (I) is the indexed value for the user file, stored in the trader profile database.

Figure 2:
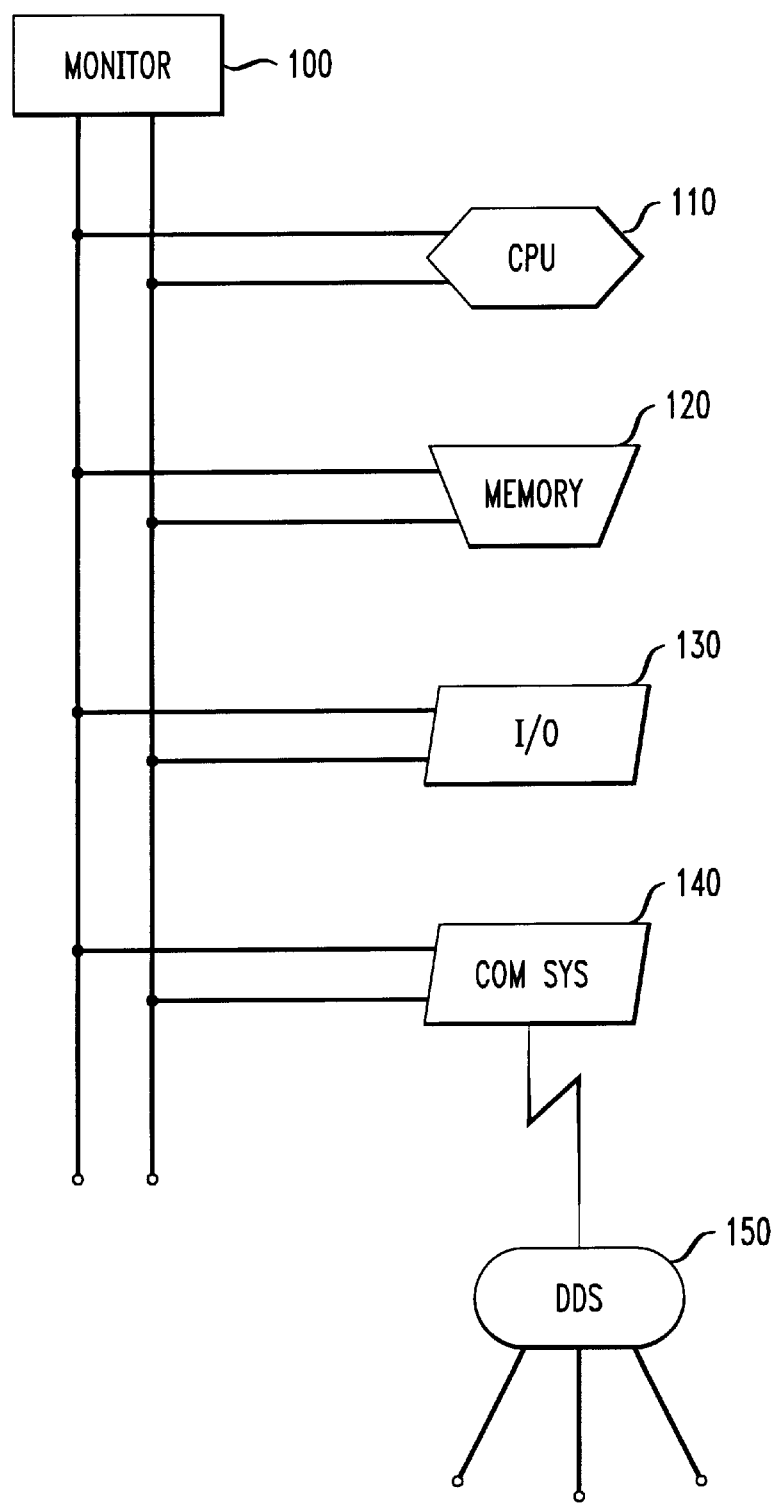
FIG. 2 is a diagram of the operative elements associated with a single work station used in the present invention.

The individual workstations are structured, in general terms as depicted in FIG. 2. In particular, system CPU 110 is linked to a terminal monitor 100 and input system (keyboard and mouse) 130 via standard address and data bus. Memory 120 includes active RAM for storage of applications and data as configured for that terminal. A communication port 140 is set for compatible linkage to the above noted networks, represented in this Figure as data distribution system 150. In addition to the applications available via the network, each workstation is uniquely programmed with an interface application to insure operation in a manner that supports broad application compatibility and interaction. This interface is presented in more detail hereinbelow.

Figure 3:
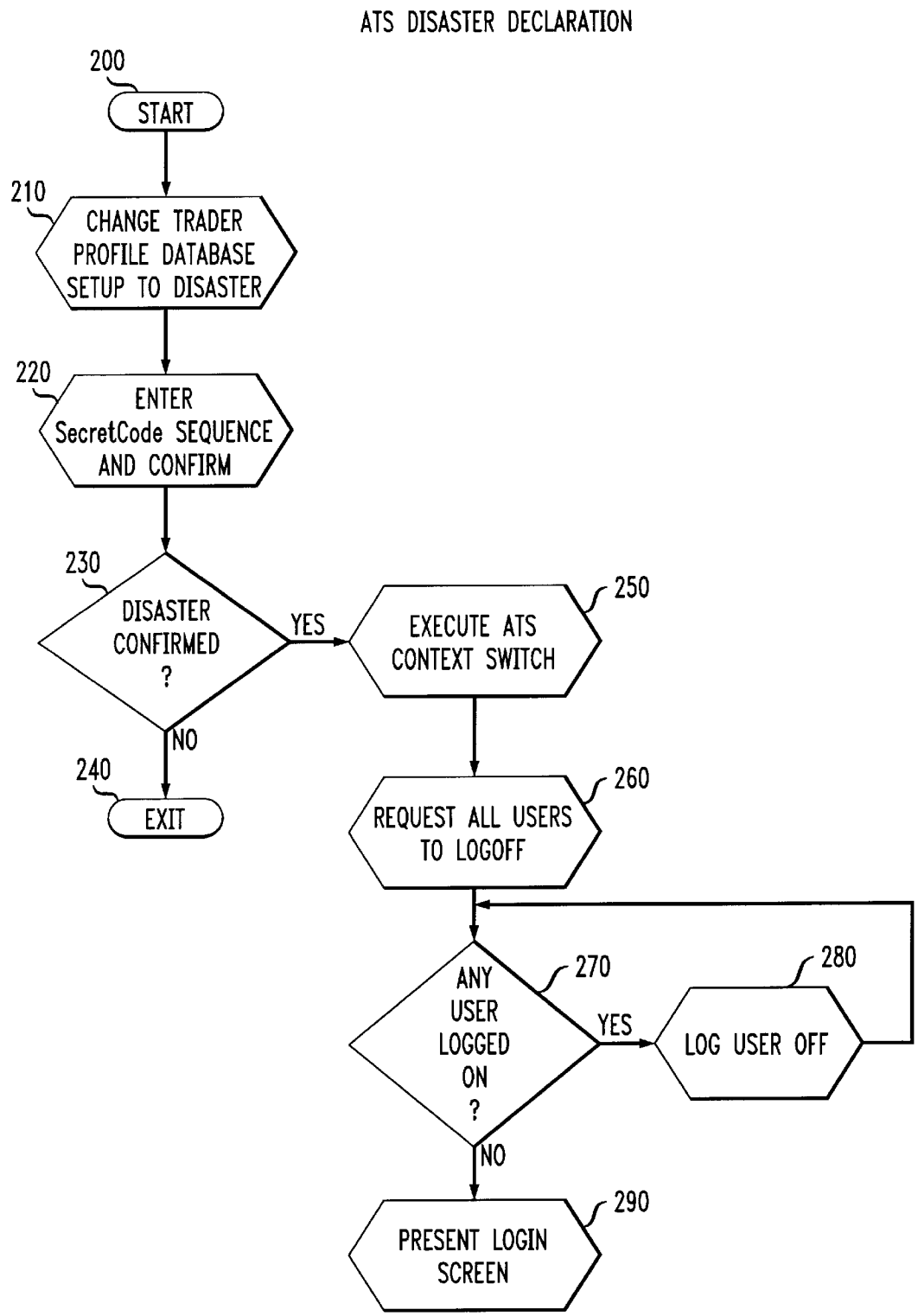
FIG. 3 is a logic flow chart presented in block form to depict the logic flow for disaster declaration in the inventive system during operation.

Recalling that the system is capable of operation in two modes, attention is now directed to FIG. 3 and the initiation of the second mode of system operation. Entry into this mode is predicated on a declaration of a disaster of sufficient impetus as to remove or substantially interrupt primary trading facilities. This is delineated in the logic flow chart, starting at block 200 (start) with logic continuing to block 210 where the trader profile database is changed to "disaster" status. In response to status change, user enters the secret code sequence and confirms the status, block 220.

The above entered code is then examined and the disaster confirmed by test 230; if no disaster, block 240 provides for system exit. A confirmed disaster passes logic to block 250 and system execution of the mode (context) switch, i.e., shifting from routine operation to a trading operation. This requires all current users in the routine run mode to log off, block 260. Any remaining on-line users are thereafter automatically logged off via test 270 and block 280. Completion of routine user log off is followed by the log-in screen providing system support to trading operations.

Figure 4:
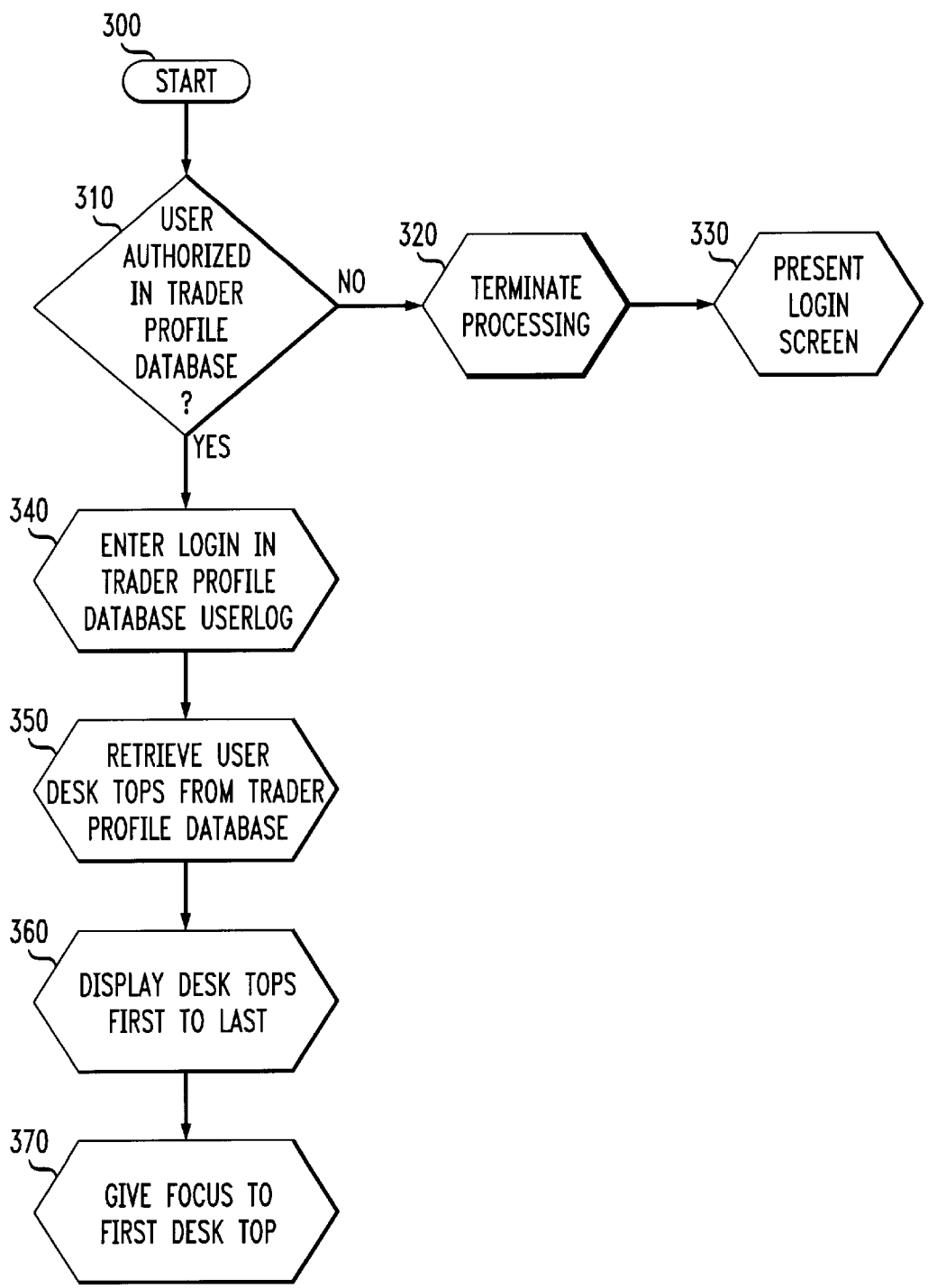
FIG. 4 is a logic flow chart presented in block diagram form to depict dynamic configuration of each work station.

Turning now to FIG. 4, the initial function of the system is to reconfigure the terminal to correspond to the particular trader as logged into that terminal. The logic command for this begins with start block 300 and then branches to test 310, wherein the USERID(I) is compared to the library of traders in the trader profile database. If no match exists, the system terminates processing block 320, and returns to the initial logon screen block 330.

However, a match in USERID(I) passes logic to block 340, with the log-on entered into the trader profile database—user log. In response to the user log entry, the system retrieves one or more "desktops" from the trader profile database, block 350. Each desktop represents a custom collection of applications, services and market linkages—conforming to the particular needs of the trader as identified by the USERID(I). For example, if the trader is active in the currency market(s), linkage to the currency market(s) is provided in accordance with a stored "desktop"

configuration specific to that trader. The system then scrolls through the available and retrieved desktops, first to last, block 360 and presents the complete desktop —first entry on screen, block 370.

Figure 5:
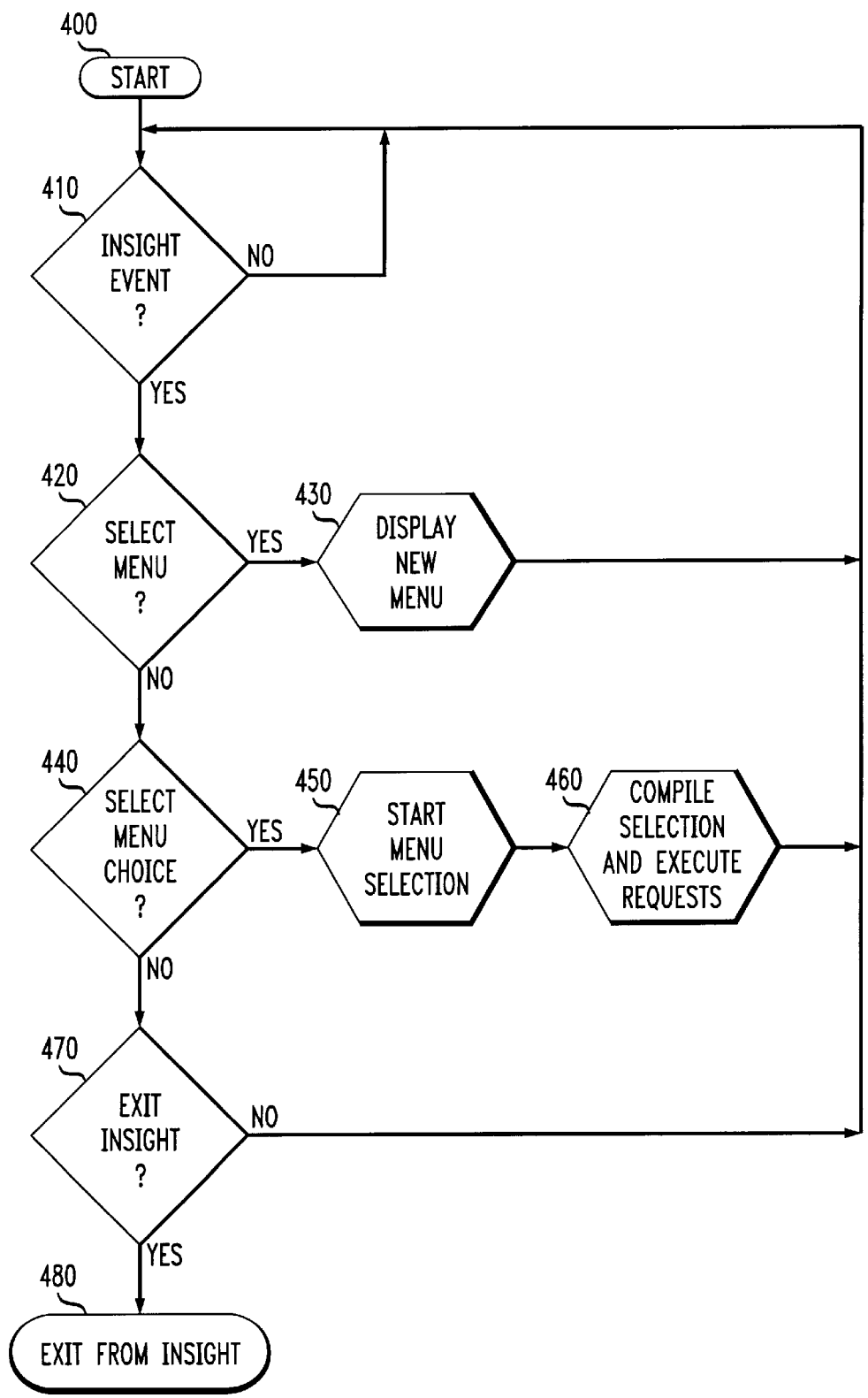
FIG. 5 is a logic flow chart presented in block diagram form to depict database query and maintenance.

In addition to traditional applications, the system provides for specialized services, accessed on a trader's workstation as needed. In particular, as delineated in FIG. 5, the system permits database query and maintenance using database query tools ("Insight"), triggered by a pre-determined event, test 410 such as notification of a disaster—wherein system access to the trader profile database is immediate and critical. Other database system events include remote access and local request via icon entry. A positive event branches logic to test 420 and the presentation of multiple menu and display options. Selection of a different menu structure by the user at test 420 provides for new menu options, block 430. At test 440, the user enters the menu choice for querying the database in accordance with the particulars of the request and the database system structure. At block 450 and 460, the choice(s) are processed and the responsive entries compiled for presentation to the user. A negative response to test 440 leads logic to an exit choice, test 470 and exit from the subsystem, block 480.

The foregoing discussion has utilized a hierarchal recitation of system logic flow. This methodology is utilized as a vehicle to best illustrate system programming logic, recognizing that much of the actual tasks are implemented in non-sequential fashion—including menu drive, icon or command line implementation of system commands. Persons skilled in the art will undoubtably recognize those aspects of system logic and structure best configured for hierarchal v. non-sequential arrangement.

Figure 6:
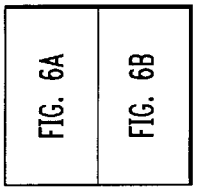
FIG. 6 is a logic flow chart presented in block diagram form to depict the virtual window manager as applied in the present inventive system.
Figure 6A:
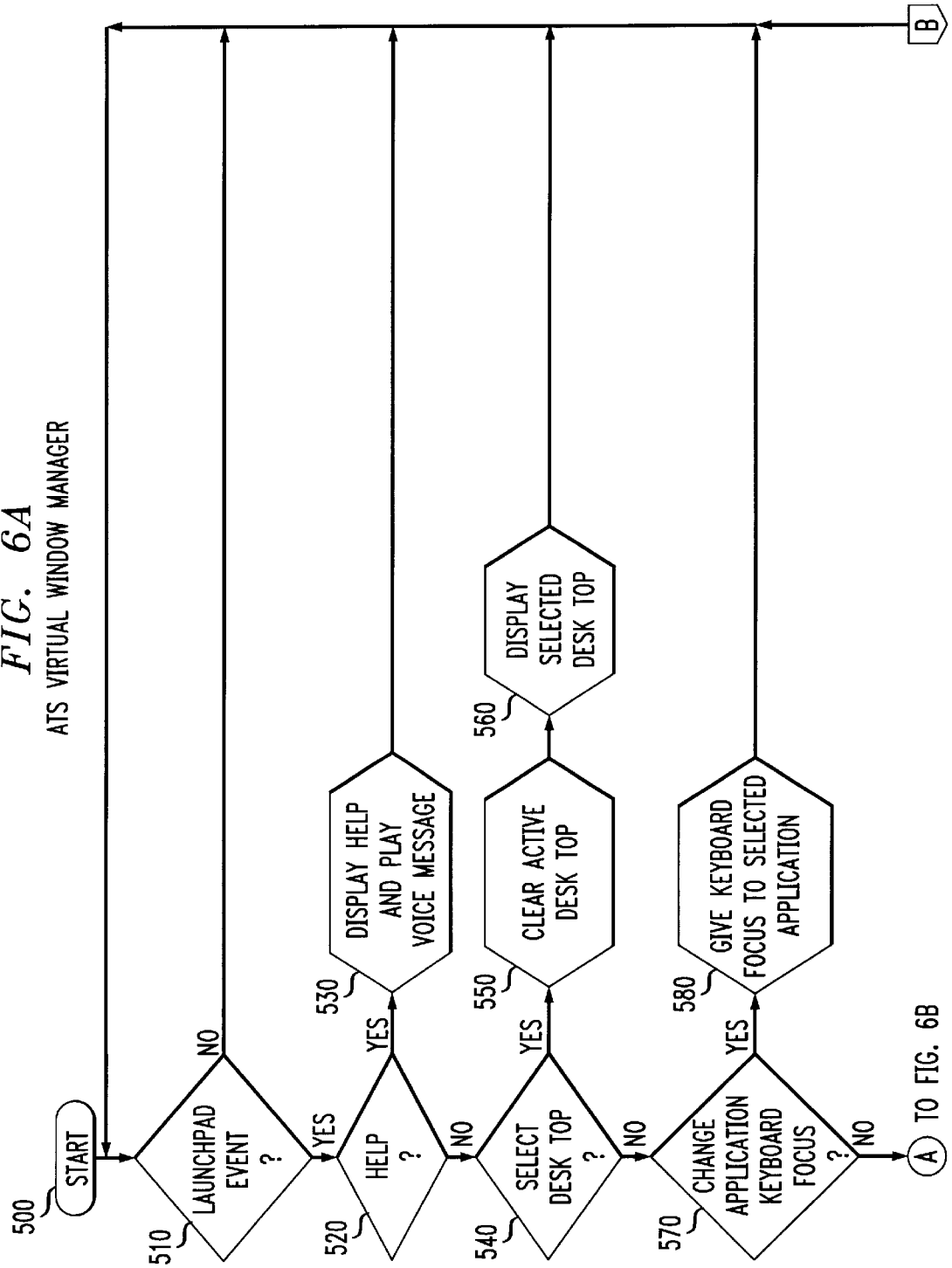

Turning now to FIG. 6, an ATS virtual window manager providing enhanced trader access to multiple disparate applications is delineated. This system is linked to the trader profile database and thus implements custom control regimens specific to the trader as identified during logon. Window control of an application is tied to the logon USERID(I) as channeled through the ATS window manager. In operation, the virtual window manager is the desktop director, controlling all functions and access links available from that workstation.

In operative terms, logic begins with start block 500 wherein the manager is loaded into active memory. At this point, however, the manager is transparent to the initial login screen and desktop—but available by entry of a launchpad event. This is triggered by function key, keystroke combination or mouse actuation, which is detected at test 510. When launched, the windows manager presents five separate modules to the user on screen, respectively indicated in FIG. 6 by tests 520, 540, 570, 590, and 670. The first module, test 520 is the path to the help system. This system contains context sensitive collection of operation instructions, available in display or voice format to the user, block 530.

The second module, test 540, provides user selection of a new desktop arrangement. Upon positive response, the current desktop, including active and passive window application icons, are cleared, block 550 and replaced with the newly selected desktop, block 560—including the newly opened and activated applications. The third module, test 570 refers to the system ability via the manager to orient the keyboard focus between the various opened window applications. For example, the user may wish to enter trade orders in the TSS application. (See above identified patent to Kalmus, et al.). The TSS window is activated for keyboard entry via block 580, enabling key-stroke input of commands and trade descriptors for this application.

The fourth module is directed to application launch external to the presently accessed desktop. Many applications are expensive to access or take significant system resources, and thus unless in use, they should be "off-line". To bring online, block 600, the launch script opens an active window within the manager, "yes" to test 610, which leads to the display of the application and use of secondary windows if needed, blocks 620–630. A negative response to test 610—no new window—redirects the newly opened application to a current window in the extent desktop, test 640 and block 650. If no windows are available for the newly opened application, block 660 reflects system window saturation and returns logic to the menu start.

The final module focuses on the logout routine, test 670, which terminates all active application processing, block 680 and presents the initial login screen to the next user, block 690.

EXAMPLE

The foregoing features can be better appreciated in the context of an illustrative example of their implementation. A system conforming to the dictates of the foregoing description is initially configured to operate in a first mode—dedicated to managing dividend payment processing for a collection of mutual funds. This operation is located in the suburbs to a major financial center, such as New York City. Separately, the system proprietor maintains a trading department located in the financial center. The trading floor is equipped with 1200 workstations of the type utilized in securities trading each with a skilled trader in attendance.

A major disruption creates a power failure in the financial center of such scope that all 1200 workstations are incapacitated, with expected down time of two to three weeks. In response, a disaster is declared and authorized disaster codes are entered via ethernet LAN 20 (FIG. 1), thus activating the trader operation at each remote workstation as depicted in FIG. 1. For each station, the user confirms disaster status on-line and logs off upon confirmation (FIG. 2).

Traders access the system, entering the appropriate login information, including the unique USERID(I) via the commands of FIG. 4, and the trader-specific desktop is presented on screen. For USERID(23), a currency trader, the desktop configuration includes four separate windows with the virtual windows manager running in the background—the "virtual" aspect of the windows manager indicates that one or more window applications are off-screen. The first two windows are for Telerate and Reuters information services—both applications are via remote link and are displayed in separate on-screen windows under the direction of the window manager. The third window is a trading screen for the currency market—futures contracts included—with details on breaking trades. The final window is that trader's "BACKOFFICE"—a clearing and settlement application directed to the trader's interaction with the market.

Interaction with each of these windows is via keystroke and transducer—with trading continuing as if emanating from the primary trading floor. At the termination of the disaster declaration, the workstations are reconfigure to operate in their initial mode—dividend management.

The above-described arrangement is merely illustrative of the principles of the present invention. Numerous modifications and adaptations thereof will be readily apparent to those skilled in the art without departing from the spirit and scope of the present invention.

What is claimed is:

1. An apparatus providing fault-tolerant operation to interrupted services associated with trading of financial assets on at least one electronic exchange, wherein said interrupted services involve a partial or complete failure of a primary computer system for implementing financial transactions on said at least one electronic exchange, said apparatus comprising:

a remote system including a plurality of work stations at one or more locations remote from said primary computer system; wherein the remote system is adapted to: (a) operate in a disaster mode of operation upon disruption of the primary computer system so as to provide for the implementation of one or more financial transactions over the electronic exchange, and (b) operate in a normal mode of operation which involves implementation of at least one transaction in addition to, other than, or in lieu of, financial transactions on said electronic exchange;

a communications mechanism adapted to establish a link between said remote system and said electronic exchange, wherein said communications mechanism provides for real time access from said remote system to said electronic exchange;

wherein said remote system includes a database and associated programming comprising:

(i) a security command to which said remote system responds by changing the operation of said remote system from said normal mode of operation to said disaster mode of operation, and a programmed command enabling select access via said remote system and said communications mechanism by at least one individual trader to said at least one exchange, (ii) an access command for providing access from said remote system via said communications mechanism to said electronic exchange; and (iii) a retrieval mechanism for retrieving from said database a desktop display configuration for each of a plurality of individual traders, said database including trader specific information defining at least one of applications, services, and on-line electronic exchange desktop configuration information.

2. The apparatus of claim 1, wherein said remote system further includes a networking mechanism in communication with said plurality of work stations.

3. The apparatus of claim 1 wherein each of a plurality of respective said work stations are individually configured to a corresponding specific trader in a manner so as to provide at least one of:

(a) a link to one or more remote information services; and (b) trading access to one or more electronic exchanges.

4. A system for providing a secondary platform to effect trading of financial assets, equipped to communicate with at least one electronic exchange, said system comprising:

a database for storage and retrieval of data, and modification of data stored therein;

an input mechanism adapted for storage of access control information into said system, including one or more code entries indicating a first mode of operation and one or more code entries indicating a second mode of operation, wherein said second mode of operation is implemented in response to a primary trading platform interruption, said secondary platform is a trading platform the input mechanism also adapted to store at least one user access code;

a data display for said second platform for information display of data associated with real time transactions corresponding to at least one of:

(i) market activity on said at least one electronic exchange, (ii) data from one or more on-line information services, and (iii) applications programs relating to said market activity or services;

a processing mechanism for receiving data from said database and determining whether access to said system is authorized and, if so, changing said system operating mode to said second mode of operation and in conformance with a pre-established set of select trading parameters stored in said database, wherein the first mode of operation is associated with financial service administration, and the second mode of operation effects said trading of financial assets on said electronic exchange, wherein said input mechanism, said database, and said processing mechanism are associated with emulating a trading terminal in communication with said electronic exchange.

5. The system of claim 4 wherein said processing mechanism further includes programmable access to one or more system databases having memory locations addressable by said input mechanism, and programmable access for accessing information on any of a plurality of individual traders.

6. The system of claim 5 wherein said trading parameters include data on one or more electronic exchanges available for access through said work station in response to said user access code.

7. The system of claim 4 further comprising a network communication mechanism for establishing one or more links to remote processors for support of trading in financial instruments and for receiving information from a remote on-line data service.

8. A data processing method for operating a fault tolerant system that provides at least one remote terminal with selected access to an electronic exchange for executing transactions in accordance with user commands, such that, in response to a hardware and/or software failure of sufficient scope that a primary trading network coupled to the electronic exchange is closed or substantially curtailed in operation, the following steps are performed:

entering in a workstation terminal a failure code and a user identification code to effect translation of said workstation to a fault-tolerant trading station;

a processing mechanism comparing said entered failure code to one or more failure codes stored in a memory device and comparing the entered user identification code to one or more user identification codes stored in the memory device and, in response to finding a match between (a) the entered failure code and at least one stored failure code, and (b) between the entered user identification code and at least one stored user identification code, causing said workstation to operate in a first mode so as to permit communication with one or more electronic exchanges and so as to provide one or more tools to a user in accordance with a stored user profile database stored in the memory device; and trading securities on said electronic exchange using said workstation in accordance with transaction requests entered at said workstation;

wherein said workstation is programmed to run in the first mode and programmed to run in a second mode, such that the second mode is adapted to implement a transaction other than, in addition to, or in lieu of, a transaction on the electronic exchange.

9. The method of claim 8 wherein the one or more tools includes access to one or more selected information services and access to one or more applications in support of trading activities.

10. The method of claim 8 wherein the step of trading securities is preceded with a step for establishing communications between the workstation terminal and a device having access to the electronic exchange.

11. The method of claim 8 further comprising a step of disabling said workstation from operating in the second mode prior to operating said workstation in the first mode.

12. A remote system providing fault-tolerant operation to interrupted services associated with trading of financial assets on an electronic exchange, wherein said interrupted services involve a complete or partial failure of a primary computer system for implementing financial transactions on the electronic exchange, the remote system comprising:

a processing mechanism adapted to operate in a first mode which involves at least one transaction other than, in addition to, or in lieu of, trading of financial assets on the electronic exchange, and also adapted to operate in a second mode which implements trading of financial assets on the electronic exchange;

an input mechanism, coupled to the processing mechanism, by which operation in the second mode is selected;

a communications mechanism, coupled to the processing mechanism and responsive to the input mechanism, such that, when the second mode is selected, the communications mechanism establishes a communications link with the electronic exchange so as to permit trading of financial assets on the electronic exchange.

13. A remote system providing fault-tolerant operation to interrupted services associated with trading of financial assets on an electronic exchange, wherein said interrupted services involve a complete or partial failure of a primary computer system for implementing financial transactions on the electronic exchange, the remote system comprising:

a processing mechanism adapted to operate in a first mode which involves at least one transaction other than, in addition to, or in lieu of, trading of financial assets on the electronic exchange, and also adapted to operate in a second mode which implements trading of financial assets on the electronic exchange;

an input mechanism, coupled to the processing mechanism, by which operation in the second mode may be selected in response to complete or partial failure of the primary computer system;

a communications mechanism, responsive to the input mechanism and coupled to the processing mechanism, such that, when the second mode is selected, the communications mechanism establishes a communications link with the electronic exchange so as to permit trading of financial assets on the electronic exchange.

14. A remote system providing fault-tolerant operation to interrupted services associated with trading of financial assets on an electronic exchange, wherein said interrupted services involve a complete or partial failure of a primary computer system for implementing financial transactions on the electronic exchange, the remote system comprising:

a processing mechanism adapted to operate in a first mode which involves at least one transaction in addition to, other than, or in lieu of, trading of financial assets on the electronic exchange, and also adapted to operate in a second mode which implements trading of financial assets on the electronic exchange;

an input mechanism, coupled to the processing mechanism, by which operation in the second mode may be selected in response to complete or partial failure of the primary computer system; the input mechanism adapted to accept one or more trading parameters when the processing mechanism is operating in the second mode so as to permit implementation of trading of financial assets on the electronic exchange, a communications mechanism, responsive to the input mechanism and coupled to the processing mechanism, such that, when the second mode is selected, the communications mechanism establishes a communications link with the electronic exchange so as to permit trading of financial assets on the electronic exchange.

15. A remote system providing fault-tolerant operation to interrupted services associated with trading of financial assets on an electronic exchange, wherein said interrupted services involve a complete or partial failure of a primary computer system for implementing financial transactions on the electronic exchange, the remote system comprising:

a processing mechanism adapted to operate in a first mode which involves at least one transaction other than, in addition to, or in lieu of, trading of financial assets on the electronic exchange, and also adapted to operate in a second mode which implements trading of financial assets on the electronic exchange;

an input mechanism, coupled to the processing mechanism, by which operation in the second mode may be requested in response to complete or partial failure of the primary computer system; the input mechanism adapted to accept one or more trading parameters when the processing mechanism is operating in the second mode so as to permit implementation of trading of financial assets on the electronic exchange, the processing mechanism including a security program for ascertaining whether or not a request for operation in the second mode will be executed;

a communications mechanism, responsive to the input mechanism and coupled to the processing mechanism, such that, when the second mode is selected, the communications mechanism establishes a communications link with the electronic exchange so as to permit trading of financial assets on the electronic exchange.

16. The remote system of claim 15 further including a memory device, coupled to the processing mechanism, for storing one or more security identification codes; wherein the input mechanism is adapted to accept a security identification code; and wherein the security program compares a security identification code accepted by the input mechanism with one or more security identification codes stored in the memory device, and, upon locating a match between the accepted security identification code and at least one stored security identification code, the security program permits the processing mechanism to operate in the second mode.

* * * * *